United States Patent [19]
Honda

[11] Patent Number: 5,175,718
[45] Date of Patent: * Dec. 29, 1992

[54] OPTICAL PICKUP APPARATUS HAVING SET POSITIONS OF DEFLECTING PRISM AND OBJECTIVE LENS

[75] Inventor: Syuichi Honda, Yokohama, Japan

[73] Assignee: Cooper & Dunham, Tokyo, Japan

[ * ] Notice: The portion of the term of this patent subsequent to Sep. 17, 2008 has been disclaimed.

[21] Appl. No.: 427,020

[22] Filed: Oct. 25, 1989

[30] Foreign Application Priority Data

Nov. 1, 1988 [JP] Japan .................. 63-277076

[51] Int. Cl.$^5$ .......................................... G11B 7/095
[52] U.S. Cl. .......................... 369/44.14; 369/44.32; 369/112
[58] Field of Search ............... 369/32, 44.14–44.22, 369/44.28, 44.32, 44.33, 112

[56] References Cited

U.S. PATENT DOCUMENTS

| | | | |
|---|---|---|---|
| 4,688,201 | 8/1987 | Towner et al. | 369/44.19 |
| 4,822,139 | 4/1989 | Yoshizumi | 369/44.16 X |
| 4,823,334 | 4/1989 | Tanaka et al. | 369/112 |
| 5,050,152 | 9/1991 | Honda | 369/44.32 |
| 5,073,888 | 12/1991 | Takahashi et al. | 369/112 |

FOREIGN PATENT DOCUMENTS 62-45614 9/1987 Japan .
2-24843 1/1990 Japan .

Primary Examiner—Wayne R. Young
Attorney, Agent, or Firm—Cooper & Dunham

[57] ABSTRACT

An optical pickup apparatus includes a device for recording and reproducing information by changing a laser beam emitted from a semiconductor laser to a parallel light and by irradiating the parallel light to an optical information recording medium sequentially through a deflecting prism and an objective lens, a device for performing focusing and tracking servo controls by guiding a reflected light from the optical information recording medium to a servo optical system sequentially through the objective lens and the deflecting prism again, and a device for setting the positions of the deflecting prism and the objective lens such that the length of an optical path from a deflecting point of the deflecting prism to a main point of the objective lens is ranged from the focal distance of the objective lens to a length twice the focal distance of the objective lens.

6 Claims, 8 Drawing Sheets

Fig. 1
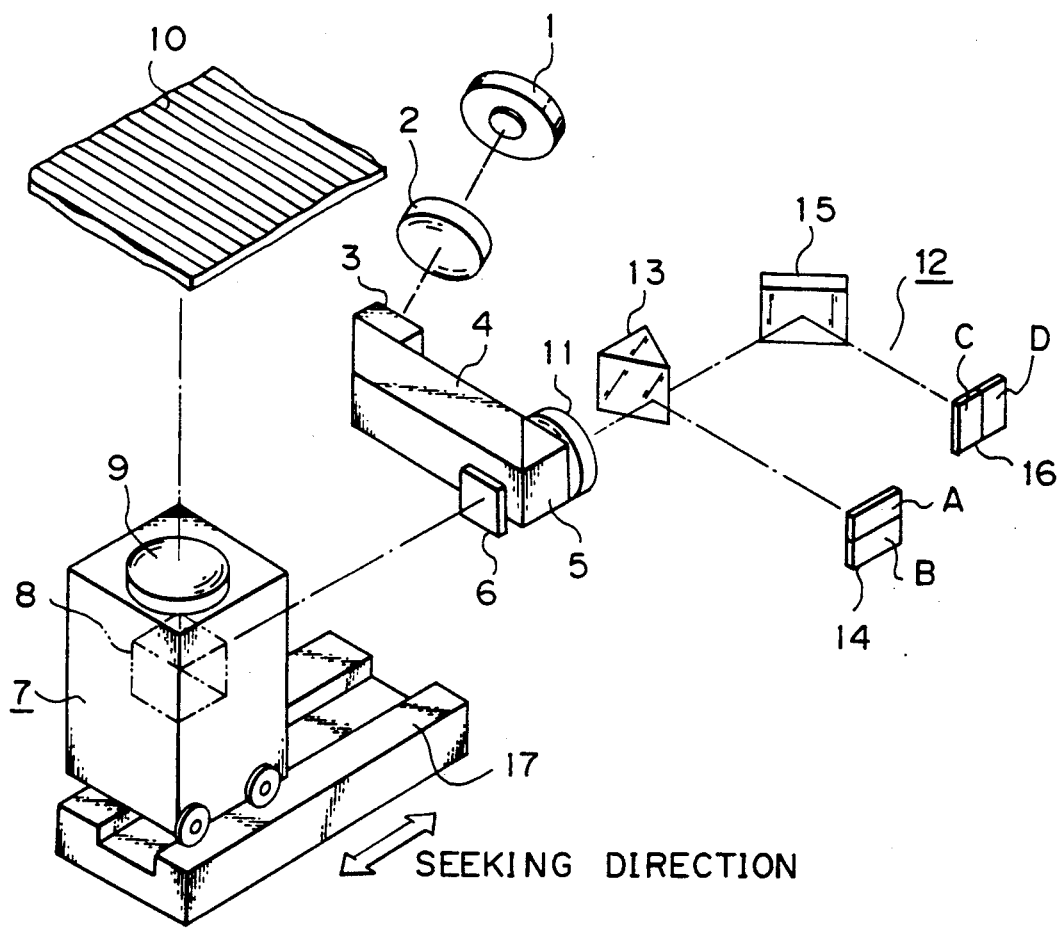
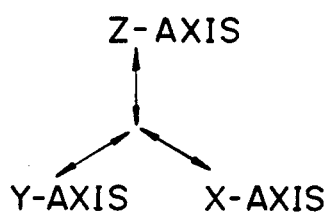
SEEKING DIRECTION
Z-AXIS
Y-AXIS    X-AXIS

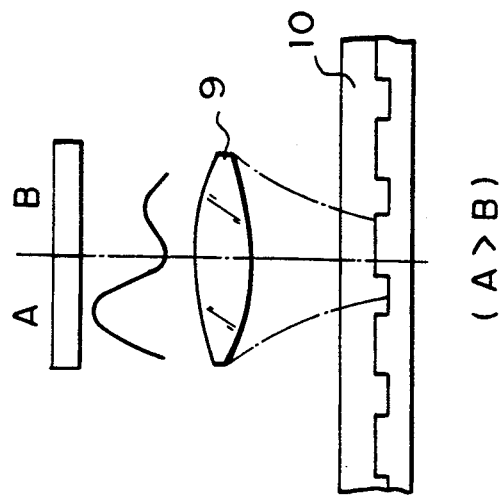
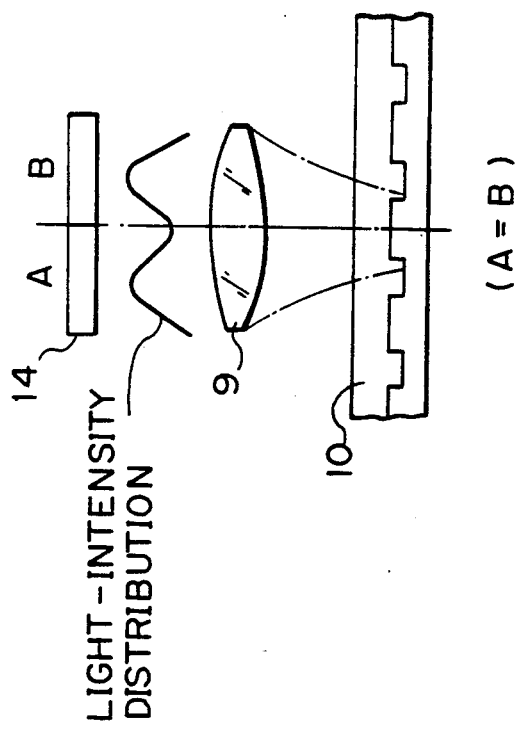

(C=D)  (C>D)  (C<D)

$(f < l < Zf)$

INCIDENT OPTICAL AXIS
(REFLECTING OPTICAL AXIS)

OPTICAL PICKUP APPARATUS HAVING SET POSITIONS OF DEFLECTING PRISM AND OBJECTIVE LENS

BACKGROUND OF THE INVENTION

The present invention relates to an optical pickup apparatus for recording and reproducing information by irradiating a laser beam onto an optical information recording medium such as an optical disk, an optically magnetic disk, etc.

In an optical pickup apparatus, when a carriage is moved in a seeking direction, an optical axis is shifted by the rotation of the carriage around the Y-axis and the Z-axis as well as the X-axis. Here, the optical axis shift caused by the rotation of the carriage around the Z-axis will especially be described.

The carriage is moved on a guide rail so that the carriage is assumed to be rotated by a certain angle around the Z-axis in inner and outer circumferential sections of an optical disk. In this case, a deflecting prism is also rotated by this angle. Accordingly, the incident optical axis with respect to the optical disk at the rotating time of the carriage is inclined by the above angle in comparison with the incident optical axis when the carriage is not rotated. Thus, the reflected light from the optical disk is shifted by a certain distance with respect to the incident optical axis.

SUMMARY OF THE INVENTION

It is therefore an object of the present invention to provide an optical pickup apparatus for almost canceling the shifts of the optical axis caused by the rotation of the carriage around the X-axis and the Z-axis.

The above object of the present invention can be achieved by an optical pickup apparatus comprising means for recording and reproducing information by changing a laser beam emitted from a semiconductor laser to a parallel light and by irradiating the parallel light to an optical information recording medium sequentially through a deflecting prism and an objective lens; means for performing focusing and tracking servo controls by guiding a reflected light from the optical information recording medium to a servo optical system sequentially through the objective lens and the deflecting prism again; and means for setting the positions of the deflecting prism and the objective lens such that the length of an optical path from a deflecting point of the deflecting prism to a main point of the objective lens is ranged from the focal distance of the objective lens to a length twice the focal distance of the objective lens.

By the above setting of the length of the optical path, the optical axis shifts caused by the rotation of the carriage around the X-axis and the Z-axis by the movement thereof in the seeking direction can be almost canceled. Thus, the track and focus error signals can be detected with less error so that the tracking and focusing servo controls can be accurately performed.

Further objects and advantages of the present invention will be apparent from the following description of the preferred embodiments of the present invention as illustrated in the accompanying drawings.

BRIEF DESCRIPTION OF THE DRAWINGS

FIG. 1 is a perspective view showing the entire construction of an optical pickup apparatus;

FIGS. 3a and 3b are views for explaining the principle of a tracking servo control;

DESCRIPTION OF THE PREFERRED EMBODIMENTS

Figure 2:
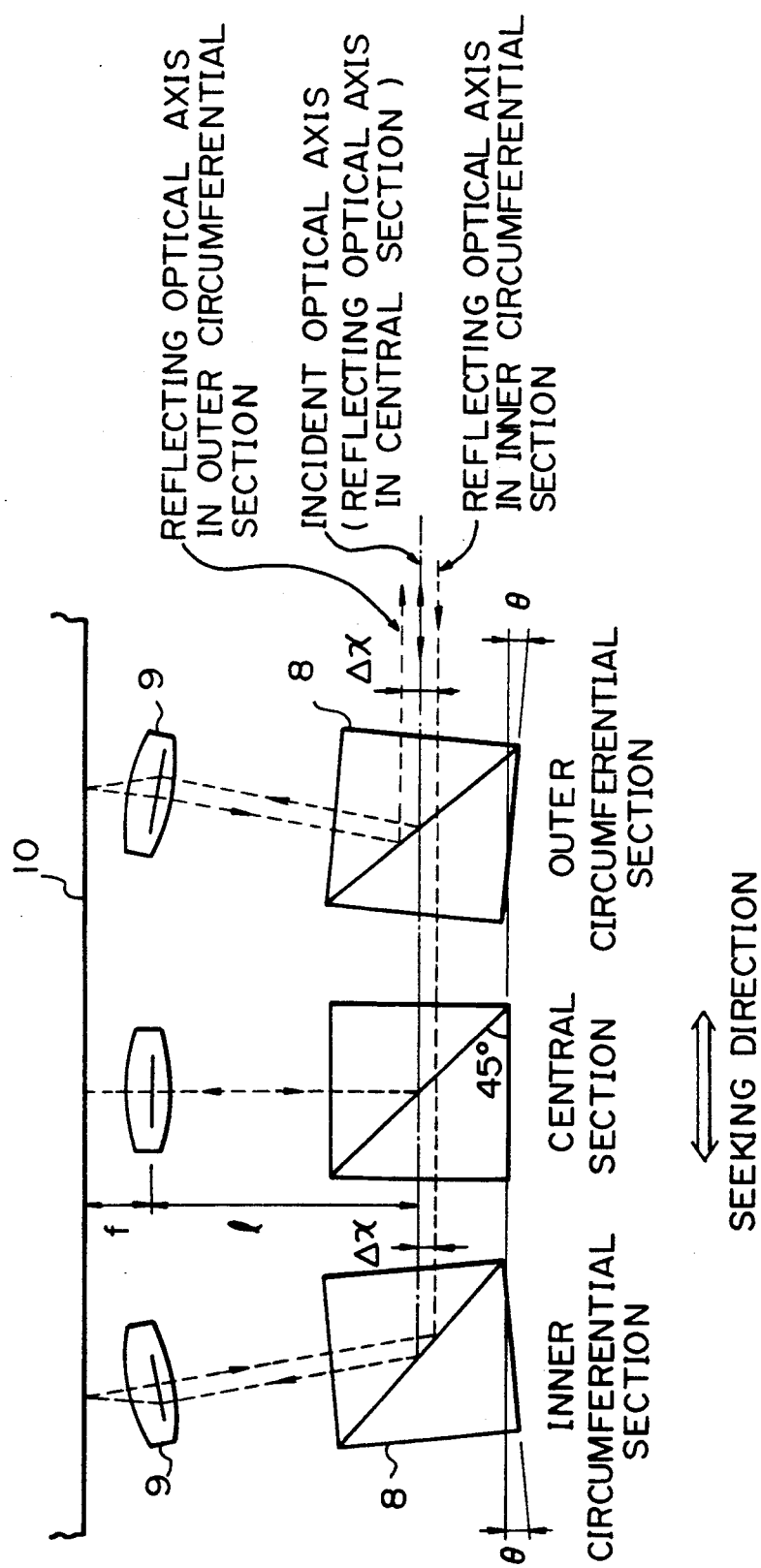
FIG. 2 is a view for explaining an optical axis shift caused by the rotation of a carriage around the X-axis.

The preferred embodiments of an optical pickup apparatus in the present invention will next be described in detail with reference to the accompanying drawings.

A general optical pickup apparatus will first be described with reference to FIGS. 1 to 4. The entire construction of the optical pickup apparatus will first be described. A laser beam emitted from a semiconductor laser 1 is changed to a parallel light beam by a coupling lens 2 and is shaped by a beam shaping splitter 3 and is further reflected sequentially by a polarizing beam splitter 5 through a roof prism 4. Thereafter, the reflected light is reflected by a deflecting prism 8 within a carriage 7 through a λ/4 plate 6 and is converged by an objective lens 9. The converged light is irradiated onto an optical disk 10 as an optical information recording medium, thereby recording and reproducing information. The light reflected by the optical disk 10 is reflected by the deflecting prism 8 through the objective lens 9 and then sequentially passes through the λ/4 plate 6, the polarizing beam splitter 5 and a converging lens 11 and is guided to a servo optical system 12. A portion of the reflected light guided to this servo optical system 12 is reflected by a knife edge prism 13 and is guided to light-receiving faces A and B of a track light-receiving element 14 to perform a tracking servo control. On the other hand, the light, which is not reflected by the knife edge prism 13 and therefore transmits therethrough, is reflected by a mirror 15 and is guided to light-receiving faces C and D of a focusing light-receiving element 16 to perform a focusing servo control.

The principle for performing the tracking and focusing servo controls will next be described briefly. With respect to the tracking servo control, when the spot laser beam is irradiated onto the optical disk 10 in a normal track position as shown in FIG. 3a, the light-receiving amounts detected on the light-receiving faces A and B of the track light-receiving element 14 separated into two sections are equal to each other so that no track error signal is detected. Therefore, no tracking servo control is performed at this time. However, when the spot light beam is shifted from the normal position as shown in FIG. 3b and the light-receiving amount detected on the light-receiving face A is greater than that on the light-receiving face B, the track error signal is detected so that the tracking servo control is performed to return the spot light beam to the normal track position.

Figures 4A, 4B, 4C:
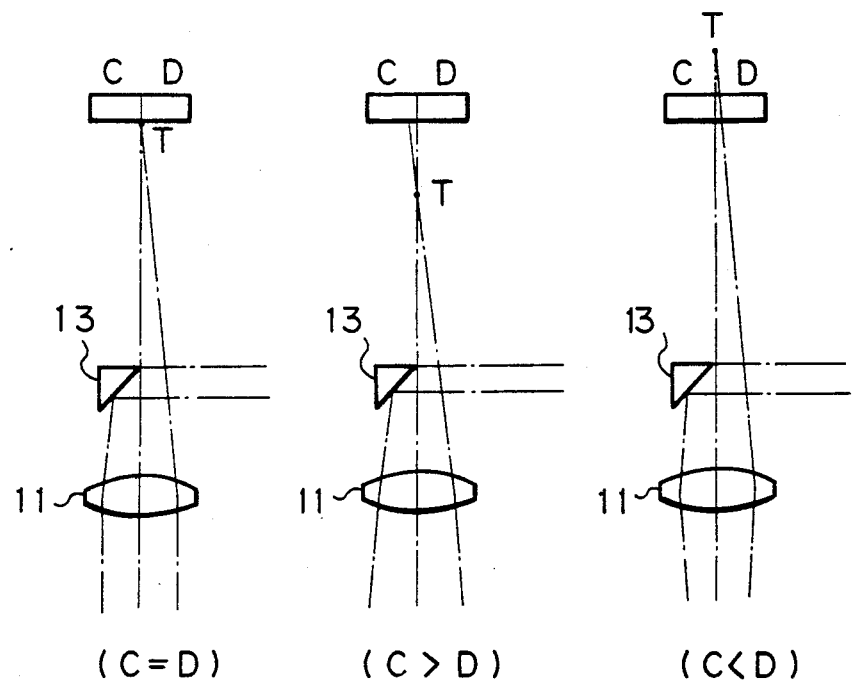
FIGS. 4a to 4c are views for explaining the principle of a focusing servo control.
Figure 5:
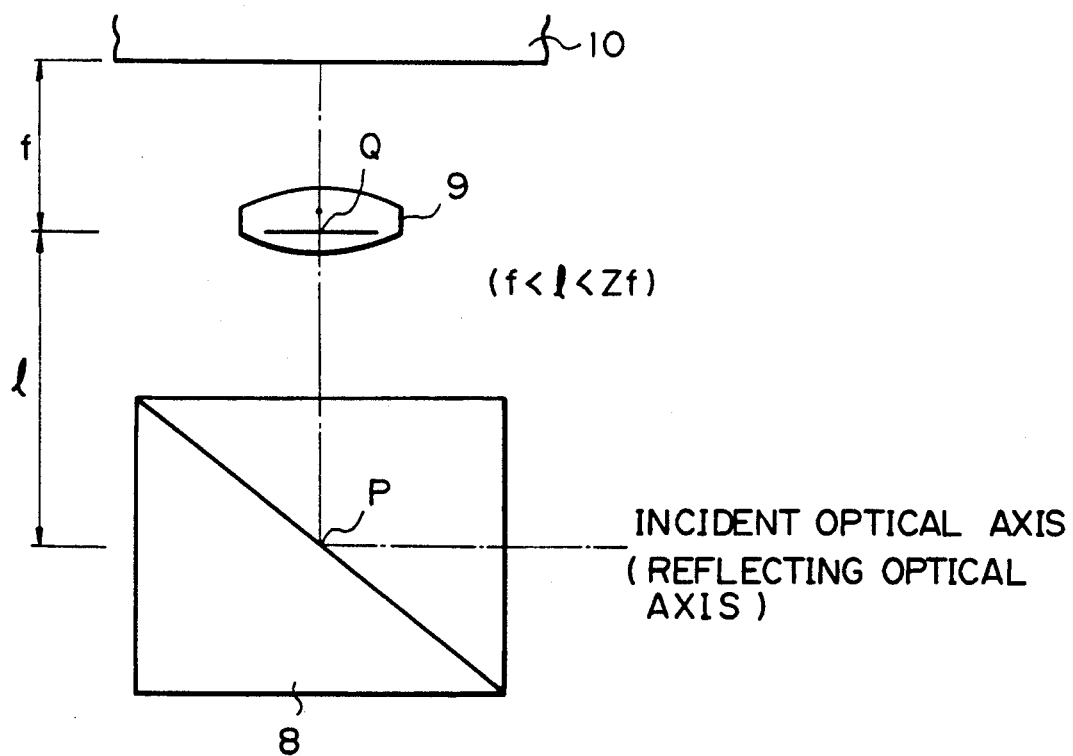
FIG. 5 is a view for explaining an optical pickup apparatus in accordance with one embodiment of the present invention.

The focusing servo control is performed by a well-known knife edge method. Namely, when a focusing relation is formed between the objective lens 9 and the optical disk 10, a focal point T of the light beam is located in a central section of the focusing light-receiving element 16 on the light-receiving faces C and D thereof. At this time, no focus error signal is detected and thereby no focusing servo control is performed. However, the focus error signal is detected and the focusing servo control is performed when the distance between the objective lens 9 and the optical disk 10 is large and the light-receiving amount on the light-receiving face A is greater than that on the light-receiving face B, as shown in FIG. 4b. Further, the focus error signal is detected and the focusing servo control is performed when the distance between the objective lens 9 and the optical disk 10 is small and the light-receiving amount on the light-receiving face A is less than that on the light-receiving face B, as shown in FIG. 4c.

In the optical pickup apparatus mentioned above, the objective lens 9 and the deflecting prism 8 are fixedly arranged within the carriage 7 and are moved on a guide rail 17 in a seeking direction. In this case, a mechanism for moving the objective lens 9 and the deflecting prism 8 is operated by rollers so that the mechanical accuracy in operation (the accuracy in attachment of the guide rail 17, flat face, etc.) is low. As a result, the carriage 7 is moved on the guide rail 17 in a state in which the carriage 7 is rotated around an X-axis direction perpendicular to the seeking direction. Normally, when the tracking servo and focusing servo controls are performed, their servo detections must be performed with the accuracy in length about 0.03 μm and 0.01 μm, respectively. Therefore, when the carriage 7 is rotated around the X-axis on the guide rail 17 as mentioned above, such servo detections cannot be normally performed. Namely, as shown in FIG. 2, a deflecting face of the deflecting prism 8 is arranged to be inclined by an angle 45° with respect to the incident optical axis of the laser beam. Further, the carriage 7 is in a state in which the optical axis of the objective lens 9 is located on the optical axis of the laser beam. In this state, the carriage 7 is rotated by an angle $\pm\theta$ with respect to the central section of the optical disk 10 when the carriage 7 is moved to an inner circumferential section of the optical disk 10, and when the carriage 7 is moved to an outer circumferential section of the optical disk 10. Thus, the reflecting optical axes in the inner and outer circumferential sections are shifted by a distance $\Delta X$ from the incident optical axis and the reflecting optical axis in the central section.

A method for canceling such an optical axis shift $\Delta X$ caused by the rotation of the carriage 7 around the X-axis is shown in Japanese patent application No. 63-175460 by the same applicant as that in this application for example. Namely, when the length of the optical path from the deflecting prism 8 to the center of the objective lens 9 is set to l and the focal distance of the objective lens 9 with respect to the optical disk 10 set to f, the following relation is obtained by a geometric calculation.

$$\Delta X \approx 2(l-2f) \qquad (1)$$

Therefore, when the following formula $$l = 2f \qquad (2)$$

is set to be formed, the optical axis shift $\Delta X$ caused by the rotation of the carriage 7 around the X-axis can almost be set to zero.

However, in the optical pickup apparatus mentioned above, when the carriage 7 is moved in the seeking direction, the optical axis shift is also caused by the rotation of the carriage 7 around the Y-axis and the Z-axis as well as the X-axis. Here, the optical axis shift $\Delta Z$ caused by the rotation of the carriage 7 around the Z-axis will especially be described.

Figure 6:
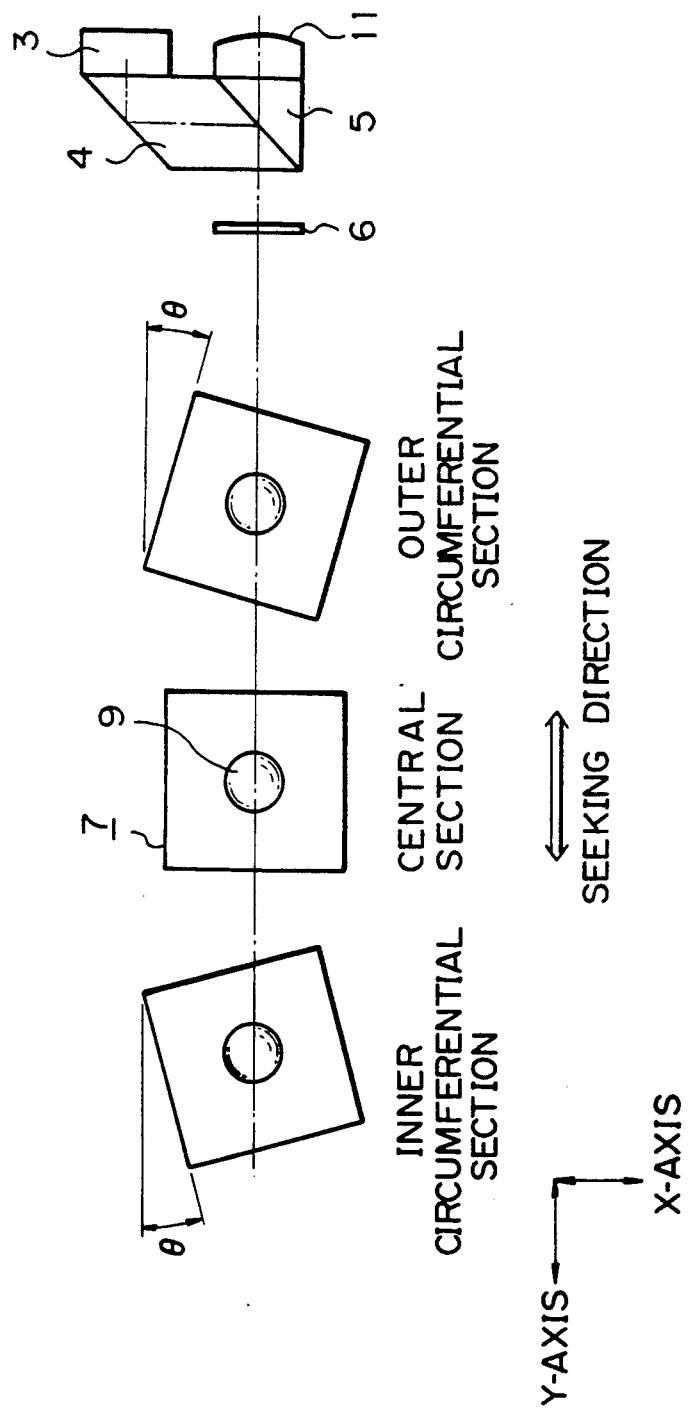
FIGS. 6 and 7 are views for explaining the optical axis shift caused by the rotation of the carriage around the Z-axis.
Figure 7:
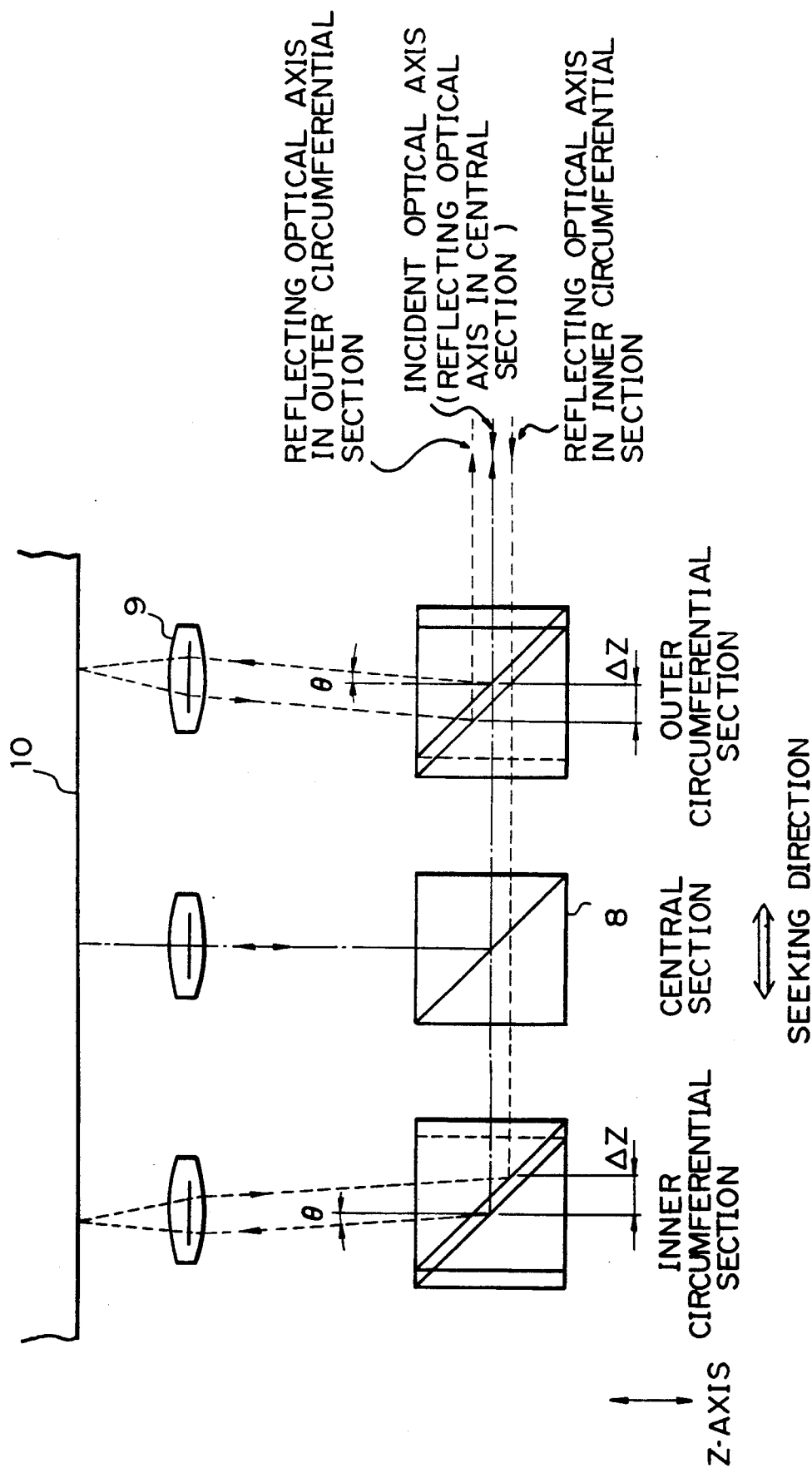

As shown in FIG. 6, the carriage 7 is moved on the guide rail 17 so that the carriage 7 is assumed to be rotated by an angle $\pm\theta$ around the Z-axis in the inner and outer circumferential sections of the optical disk 10. In this case, the deflecting prism 8 is also rotated by the angle $\pm\theta$. Accordingly, as shown in FIG. 7, the incident optical axis with respect to the optical disk 10 at the rotating time of the carriage 7 is inclined by the angle $\theta$ in comparison with the incident optical axis when the carriage 7 is not rotated. Thus, the reflected light from the optical disk 10 is shifted by a distance $\Delta Z$ with respect to the incident optical axis. The optical axis shift $\Delta Y$ caused by the rotation of the carriage around the Y-axis will be complementarily explained in the embodiment described later.

An optical pickup apparatus in one embodiment of the present invention will next be described with reference to FIGS. 5 to 9. The entire construction of the optical pickup apparatus is already described before and therefore is not described here. The same portions as those in FIGS. 1 to 4 are designated by the same reference numerals.

When the length of the optical path from a deflecting point P of the deflecting prism 8 within the carriage 7 to a main point Q of the objective lens 9 is set to l and the focal distance of the objective lens 9 with respect to the optical disk 10 as an optical information recording medium is set to f, the positions of the deflecting prism 8 and the objective lens 9 are set within the carriage 7 such that the following relation is satisfied.

$$f < l < 2f \qquad (3)$$

Figure 8:
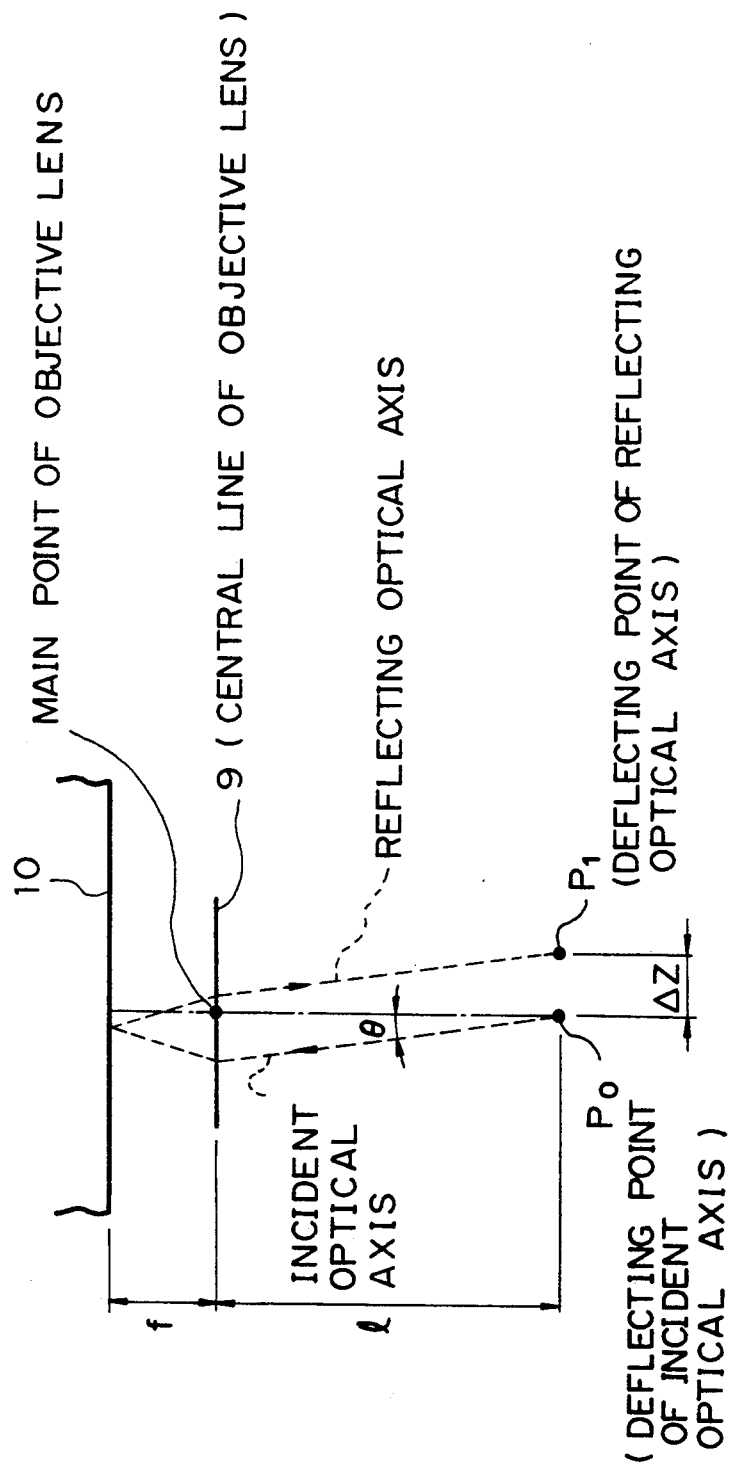
FIG. 8 is a view for explaining the optical axis shift between an incident optical axis and a reflecting optical axis.

The reasons for setting the above formula (3) to be satisfied in the present invention will next be explained. As explained in the optical pickup apparatus shown in FIG. 1, the carriage 7 is integrally constructed by the objective lens 9 and the deflecting prism 8 and is moved along the guide rail 17 in the seeking direction, i.e., in the inner and outer circumferential directions of the optical disk 10. In this case, as explained in relation to FIG. 6, the carriage 7 is rotated around the X-axis as well as the Z-axis by the movement thereof in the seeking direction due to dispersion in mechanical accuracy of the mechanism for moving the carriage 7. Thus, the optical axis shift $\Delta Z$ is caused between the incident optical axis and the reflecting optical axis. Such a situation is shown in FIG. 8. In this figure, the optical axis shift $\Delta Z$ is caused between a deflecting point $P_0$ of the incident optical axis of the deflecting prism 8 and a deflecting point $P_1$ of the reflecting optical axis thereof. When the carriage 7 is rotated by the angle $\theta$ around the Z-axis, the optical axis shift $\Delta Z$ between the incident and reflecting optical axes is provided by a geometric calculation as follows.

$$\Delta Z \approx 2(l-f)\theta \qquad (4).$$

The optical axis shift $\Delta Z$ can be almost set to zero and its influence can be thereby canceled from this formula (4) by satisfying the following relation, $$l = f \qquad (5).$$

It is necessary to satisfy the above-mentioned relation of the formula (2) to cancel the influence on the optical axis shift $\Delta X$ caused by the rotation of the carriage 7 around the X-axis.

Accordingly, it is necessary to set the inequality $f < l < 2f$ shown in the formula (3) as a condition for simultaneously satisfying the above relations of the formulas (2) and (5). By such a setting, both the optical axis shifts $\Delta X$ and $\Delta Z$ can be canceled so that the track and focus error signals can be detected while the error in track and focus error signals can be minimized. Therefore, the tracking and focusing servo detections can be accurately performed.

Figure 9:
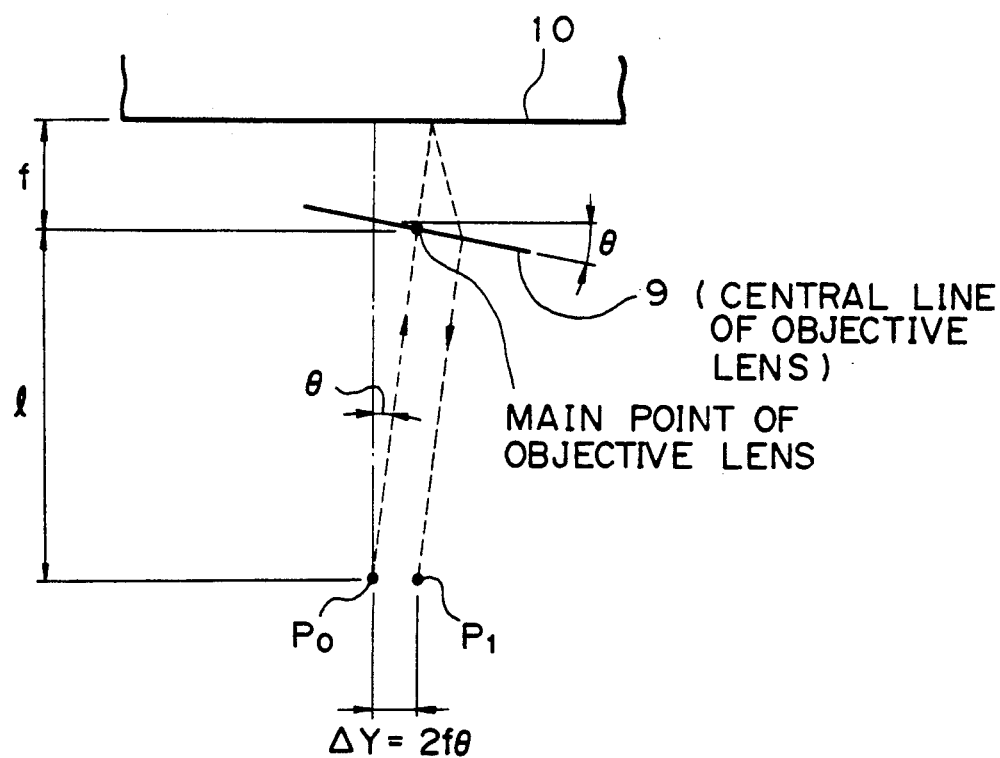
FIG. 9 is a view for explaining the optical axis shift between the incident and reflecting optical axes when the carriage is rotated around the Y-axis.

FIG. 9 shows a situation of the optical axis shift $\Delta Y$ when the carriage 7 is rotated by the angle $\theta$ around the Y-axis. In this case, the objective lens 9 is also rotated by the angle $\theta$ by the rotation of the carriage 7. Therefore, the optical axis shift $\Delta Y$ is caused in only the X-axis direction and is $2f\theta$ in the seeking direction, i.e., between the inner and outer circumferences of the optical disk 10.

As mentioned above, in the present invention, the positions of the deflecting prism and the objective lens are set such that the length $l$ of the optical path from the deflecting point of the deflecting prism to the main point of the objective lens satisfies the inequality relation $f < l < 2f$ with respect to the focal distance $f$ of the objective lens. Therefore, by setting the inequality $f < l < 2f$, the optical axis shifts caused by the rotation of the carriage around the X-axis and Z-axis directions by the movement thereof in the seeking direction can be almost canceled. Thus, the track and focus error signals can be detected with less error so that the tracking and focusing servo controls can be accurately performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical pickup apparatus comprising:
   means for recording and reproducing information wherein a laser beam emitted from a semiconductor laser is changed to a parallel light beam and the parallel light beam is irradiated to an optical information recording medium sequentially through a deflecting prism and an objective lens;
   means for performing focusing and tracking servo control wherein a reflected light beam from the optical information recording medium is guided to a servo optical system sequentially through said objective lens and said deflecting prism again; and
   means for setting the positions of the deflecting prism and the objective lens such that the length of an optical path from a deflecting point of the deflecting prism to a main point of the objective lens is within a range from the focal distance of the objective lens to a length twice the focal distance of the objective lens.

2. An optical pickup apparatus as claimed in claim 1, wherein the parallel light beam is produced by a coupling lens.

3. An optical pickup apparatus as claimed in claim 1, wherein the deflecting prism and the objective lens are disposed within a carriage.

4. An optical pickup apparatus as claimed in claim 3, wherein the tracking servo control is performed by moving the carriage in the inner and outer circumferential directions of a disk.

5. An optical pickup apparatus as claimed in claim 3, wherein shifts of an optical light beam axis caused by a rotation of the carriage about X-axis and Z-axis directions are substantially canceled.

6. An optical pickup apparatus comprising:
   means for recording and reproducing information wherein a laser beam emitted from a semiconductor laser is changed to a parallel light beam using a coupling lens and the parallel light beam is irradiated to an optical information recording medium sequentially through a deflecting prism and an objective lens disposed within a carriage;
   means for performing focusing and tracking servo control wherein a reflected light beam from the optical information recording medium is guided to a servo optical system sequentially through said objective lens and said deflecting prism again; and
   means for setting the positions of the deflecting prism and the objective lens such that a length $l$ of an optical path from a deflecting point of the deflecting prism to a main point of the objective lens satisfies an inequality relation $f < l < 2f$ with respect to a focal distance $f$ of the objective lens.

* * * * *

UNITED STATES PATENT AND TRADEMARK OFFICE
CERTIFICATE OF CORRECTION

PATENT NO. : 5,175,718
DATED : December 29, 1992
INVENTOR(S) : Syuichi HONDA

It is certified that error appears in the above-indentified patent and that said Letters Patent is hereby corrected as shown below:

On the title page item "[73]" should read:

-- [73] Assignee: Ricoh Company, Ltd., Tokyo, Japan --

Signed and Sealed this

Twelfth Day of March, 1996

Attest:

BRUCE LEHMAN

Attesting Officer    Commissioner of Patents and Trademarks